Aug. 26, 1924.  
H. L. WALKER  
1,506,511  
METHOD AND MEANS FOR FASTENING PARTS  
Filed March 28, 1923
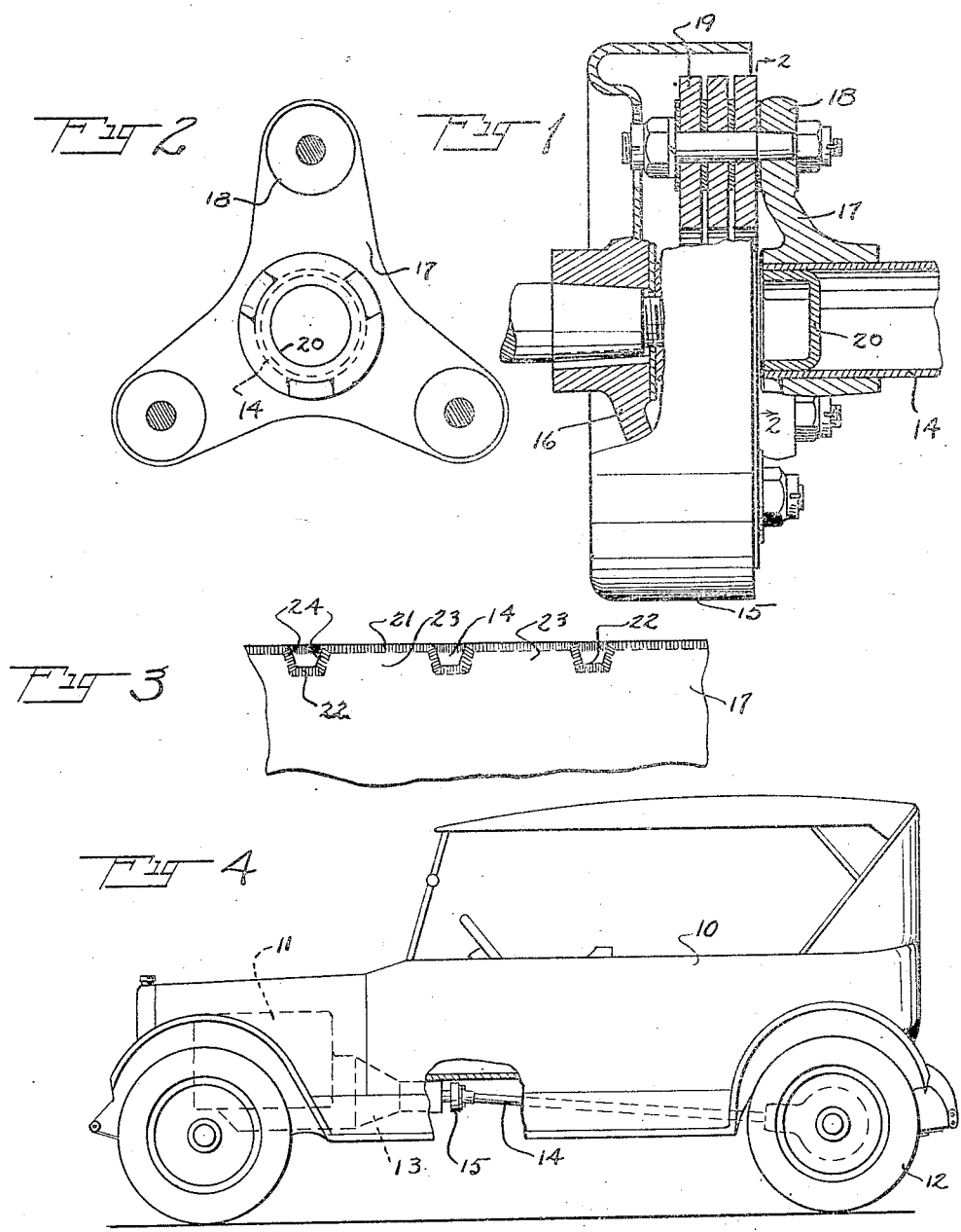
INVENTOR  
Hiram L. Walker  
BY Albert M. Austin  
ATTORNEY Patented Aug. 26, 1924.

1,506,511

UNITED STATES PATENT OFFICE.

HIRAM L. WALKER, OF CLEVELAND, OHIO, ASSIGNOR TO CHANDLER MOTOR CAR COMPANY, OF CLEVELAND, OHIO, A CORPORATION OF OHIO.

METHOD AND MEANS FOR FASTENING PARTS.

Application filed March 28, 1923. Serial No. 628,256.

*To all whom it may concern:*

Be it known that I, HIRAM L. WALKER, a citizen of the United States, and resident of Cleveland, in the county of Cuyahoga and State of Ohio, have invented certain new and useful Improvements in Methods and Means for Fastening Parts, of which the following is a specification.

This invention relates to welded joints adapted for use in fastening a flange or other element to the end or ends of a metal tube.

The invention is adapted for use in any mechanism subjected to severe strains and vibrations. For the purpose of illustrating one way in which the invention may be employed, there is shown herein a motor vehicle to which the invention may be applied, although it is understood that the scope of the invention is not to be limited thereby.

Broadly stated, it is the object of the present invention to provide an improved driving gear of rugged construction to withstand severe vibrations and excessive applications of power.

In accordance with this object, I provide a propeller shaft of improved construction, and an improved method of assembling the propeller shaft to other parts of the driving gear.

Another object relates to the provision of a joint between three parts having substantially no play between any of the parts, and subsequently welding the parts. According to another feature of the invention the weld is made along an irregular circumferential line around the propeller shaft, so as to form dovetails, and thus effectually to prevent shearing off the propeller shaft along the line of metal weakened by the welding operation.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the drawings,

Figure 1 is a side elevation of a propeller shaft and universal joint with parts broken away;

Figure 2 is a section taken on the line 2—2 of Figure 1;

Figure 3 is a developed view of the fastening of Figure 1 as if cut apart and spread out flat; and Figure 4 shows an assembled automobile with the propeller shaft in place.

Referring to Figure 4, there is shown a motor vehicle 10, which may be of any conventional type, having a prime mover 11 operatively connected to the rear or driving wheels 12, through a driving gear comprising a usual transmission 13 and propeller shaft 14. On account of the difference in horizontal level of the prime mover 11 and the center of the driving wheels 12, it is usual to include in the drive gear one or more universal joints, such as the universal 15. That shown consists of a pair of oppositely disposed flanges 16, 17 (see Figure 2), each secured to a shaft, and each having an odd number of radially extending ears, such as 18. The hub portion of the flange 17 is notched in a desired number of places, three such notches being shown. The respective ears 18 of the two flanges are disposed in parallel planes spaced apart, and there is positioned between these planes a suitable plurality of flexible elements 19, secured to the ears 18 by suitable bolts in a well-known manner. There is thus provided a universal joint for joining the ends of two shafts which are slightly out of alignment as shown in Figure 4.

In order that the invention may be more fully understood, the method of assembling the flange 17 to the propeller shaft 14 will now be described. As shown the propeller shaft 14 is a tube having relatively thin walls, it being an important feature of the invention that a tube having walls of thin material may be employed. The notched crowfoot-like flange 17 is first heated and is then shrunk into place on the end of the shaft 14, causing it to exert a powerful shrinking or gripping action upon the shaft, effectively eliminating any play or vibration between these two parts. Thus there is provided a fastening which alone will withstand a considerable torque.

A cup shaped plug 20 is then pressed into position within the end of the tubular shaft 14, as shown in Figure 1. The abutting ends of the three parts are then welded together, the weld being made along the irregular line of the notches, as shown in Figure 3. Although the welded metal 21 is strong and rugged, the tube metal adjacent to the weld is usually somewhat impaired by the heat of the welding operation, and this weakened section is represented by the line 22 in Figure 3. The line 22, 22 is broken by the series of notches and the metal in spaces 23, 23 is unimpaired by the welding operation as it does not come in contact with the welding flame. These spaces form dovetails or teeth which effectually prevent shearing off the fastening. Furthermore the strong and rugged welded metal lengthwise of the flange along lines 24, 24 forms driving lugs or keys.

Thus it will be seen that I have provided an improved connection between the parts of a motor vehicle, for effectively withstanding severe road shocks and driving strains. A very strong integral unit is obtained without drilling, cutting or distorting the tube in any manner. A tube having relatively thin walls may be employed, thus effecting a material saving in cost. The end plug 20 acts as a heavy re-inforcement for the tube, especially at the places where the tube is uncovered by the notches in the flange.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having thus described my invention, I claim:

1. In the art of welding to produce a unitary structure, the method of welding a tubular member to a solid member provided with notches having spaced apart walls which consists in reinforcing the joint by means of an annular metal ring placed on the side of the tubular member opposite the solid member, then directing the welding arc to fuse the metal of the tubular member and portions of the solid member and the reinforcing ring to form a seam, said seam being formed in an irregular line corresponding with the outlines of said notches.

2. In the art of welding to produce a unitary structure, the method of welding a tubular member to a solid member which consists in supplying additional metal by means of a reinforcing member on the tubular member opposite the solid member, and directing the welding arc around a portion of the joint to form a seam and at intervals directing the arm to form a seam on a line approximately parallel to the first mentioned portion of the seam, said offset portion being joined to the main portion of the seam by welds spaced apart a distance sufficient to prevent burning of the metal between said welds.

3. The combination with a hollow tubular shaft, of a radial flange having an annular hub apertured to fit snugly over the shaft and provided with spaced circumferential notches, and a metal ring fitted within the shaft opposite the hub, said parts being welded together along the joint and the edges of the notches without burning the metal enclosed by said notches.

4. The combination with a hollow tubular shaft, of a solid hub mounted thereon, said hub being apertured to fit snugly over the shaft and provided with spaced circumferential notches, said notches having their sides spaced apart a distance to prevent burning the metal of the tubular member between the notches when the seam is welded, and a ring of reinforcing metal fitted within the shaft opposite the hub thereby to supply additional metal to the seam during the welding operation.

5. The combination with a hollow tubular shaft, of a connecting member comprising a radial flange and an annular hub apertured to fit snugly over the shaft, said hub being cut away at intervals to expose the surface of the shaft and to form recesses having flaring side walls spaced apart to permit welding along said side walls without burning the metal of the shaft exposed at the center of the recesses, and a reinforcing member within the shaft opposite the hub, said parts being welded together around the entire periphery of the hub.

6. In a welded metal structure, comprising a hollow tubular member, a radial flange having an annular hub formed integral therewith and apertured to fit snugly over said hollow member, said hub being provided with spaced notches having flaring sides and a metal reinforcing plug fitted within the tubular member opposite said hub, said parts being welded together along the joint and the sides of the notches.

Signed at Cleveland, in the county of Cuyahoga and State of Ohio, this twentieth day of March, A. D. 1923.

HIRAM L. WALKER.